March 17, 1925.
T. W. JARDINE ET AL
1,529,793
GAS PIPE SAFETY APPLIANCE
Filed May 9, 1923
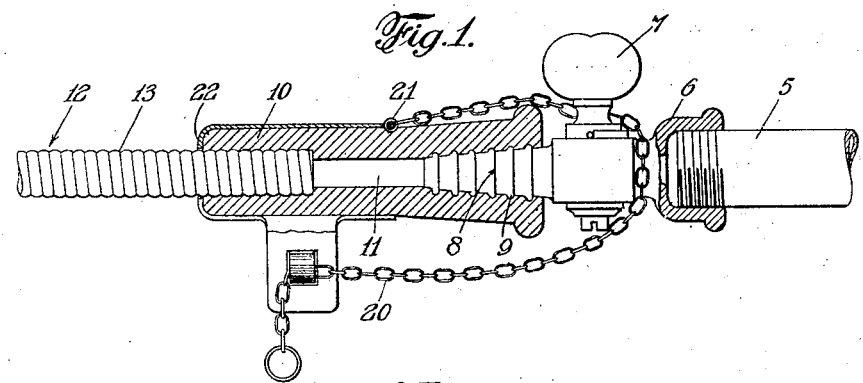
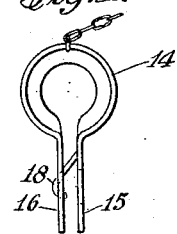
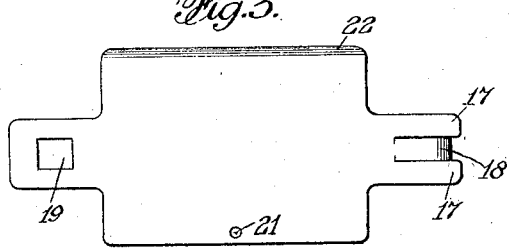
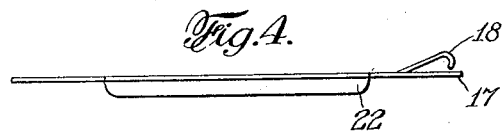
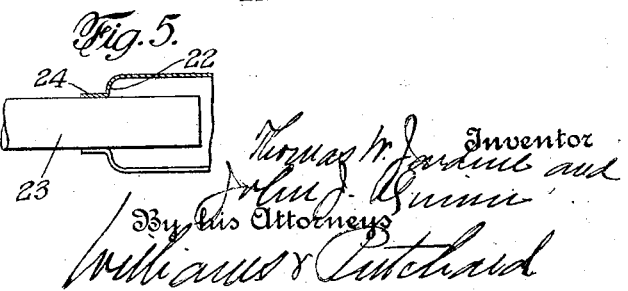

Patented Mar. 17, 1925.

1,529,793

UNITED STATES PATENT OFFICE.

THOMAS W. JARDINE AND JOHN J. QUINN, OF ENGLEWOOD, NEW JERSEY.

GAS-PIPE SAFETY APPLIANCE.

Application filed May 9, 1923. Serial No. 637,712.

*To all whom it may concern:*

Be it known that we, THOMAS W. JARDINE and JOHN J. QUINN, both citizens of the United States, and residing at Englewood, county of Bergen, State of New Jersey, have invented certain new and useful Improvements in Gas-Pipe Safety Appliances, of which the following is a specification.

This invention relates to safety appliances adapted to be used particularly in connection with gas pipe or conduit joints.

An important object of our invention is to provide a device of the character mentioned which may be readily attached to the connected ends of pipes or conduits and when so constructed will function as an effective means for maintaining a positive connection therebetween.

Other objects and certain advantages of the invention will become apparent from the following description when taken in connection with the accompanying drawings in which, Fig. 1 is a view partly in section and partly in elevation of two connected gas conduits with which the device embodying our invention is adapted to be used.

Fig. 2 is an end view of the device embodying our invention.

Fig. 3 is a plan view of a blank from which the device is formed.

Fig. 4 is an edge view of the blank shown in Fig. 3.

Fig. 5 is a fragmental sectional view showing a modification of the device which renders the same particularly adapted to be used in connection with conduits other than those constructed wholly or in part from metal.

In the drawings, wherein for the purpose of illustration, are shown what we at present consider the preferred forms of our invention, the numeral 5 indicates a gas-pipe to the threaded end of which is connected the conventional type of gas jet 6 having a rotary valve 7 associated therewith and provided with a tapered outlet end 8 upon which is formed a series of parallel circumferential ribs 9 which, as will readily be understood, facilitates the holding of a rubber or other nipple 10 thereupon. This nipple is of usual construction and is provided with a central passage 11 which communicates with a conduit 12 having a flexible metallic armour 13 associated therewith.

The device embodying our invention is adapted to be applied, as shown in Fig. 1, and comprises a split sleeve 14 having wings 15 and 16, the wing 15 being split, as shown at 17, to provide a tongue 18 which is adapted to enter an opening 19 formed in the wing 16 when the sleeve is assembled upon the nipple 10. Inasmuch as the sheet metal from which the sleeve 14 is formed is more or less resilient, the tongue 18 is adapted to function as a means for gripping one end of a chain 20 which, at its other end, is secured to the sleeve 14, as shown at 21. This chain, as clearly shown in Fig. 1, is passed around the valve 7 and being so positioned functions as a reliable means for retaining the nipple 10 properly positioned upon the outlet end 8 of the jet 6, inasmuch as the outer end of the sleeve 14 is provided with a flange 22 which is adapted to engage the outer end of the nipple 10 within which is fitted the conduit 12.

In the event the device embodying our invention is to be used in connection with a rubber hose or conduit 23, the flange 22 may be provided with an extension, as shown at 24, which will relieve the conduit at its jointure with the nipple 10 from any undue wear and yet provide an adequate gripping engagement with the surface of the hose to facilitate the holding of the device in position upon the nipple 10.

While we have shown and described the preferred forms of our invention, it is to be understood that various changes in the size, shape and arrangement of the parts embodied therein may be resorted to without departing from the spirit of our invention or the scope of the subjoined claims.

Having thus described our invention, we claim:

1. A device of the character described comprising a split sleeve having adjoining edges terminating in wings, one of said wings being provided with an opening, the other of said wings being provided with a tongue adapted to enter said opening and a locking element attached at one end to said sleeve and adapted to engage and be maintained in connection with said wings by said tongue.

2. The combination with a gas jet having a nipple positioned upon the end thereof, of a split sleeve embracing said nipple, said sleeve being provided at its adjoining edges with wings, one of said wings being provided with an opening, the other of said wings being provided with a tongue adapted to enter said opening and a flexible retaining element secured at one end to said sleeve and adapted to be attached at its other end to said wings by said tongue, said retaining element being adapted to embrace said jet whereby said nipple is maintained in position upon the end thereof.

3. The combination with a gas jet having a nipple positioned upon the end thereof, said nipple being provided with a conduit, of a split sleeve carried by said nipple and terminating in wings and having a flange at one end thereof adapted to engage one end of said nipple and a flexible retaining element secured at one end to said sleeve and adapted to be attached at its other end to said wings, said retaining element being adapted to embrace said gas jet whereby said nipple is maintained in position upon the end thereof.

4. The combination with a gas jet having a nipple positioned upon the end thereof and carrying a conduit, of a sleeve embracing said nipple, said sleeve being provided with a flange adapted to engage one end of said nipple and the peripheral surface of said conduit at its jointure with said nipple and means for locking said sleeve in position upon said nipple whereby said nipple is maintained in position upon said jet.

In testimony whereof, we have affixed our signatures to this specification.

THOMAS W. JARDINE.
JOHN J. QUINN.